United States Patent
Nambu et al.

(10) Patent No.: US 11,976,621 B2
(45) Date of Patent: May 7, 2024

(54) ENGINE START CONTROL DEVICE

(71) Applicant: MITSUBISHI JIDOSHA KOGYO KABUSHIKI KAISHA, Tokyo (JP)

(72) Inventors: Sosuke Nambu, Tokyo (JP); Norihiko Ikoma, Tokyo (JP); Takanori Sugimoto, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 261 days.

(21) Appl. No.: 17/639,697

(22) PCT Filed: Sep. 25, 2020

(86) PCT No.: PCT/JP2020/036267
§ 371 (c)(1),
(2) Date: Mar. 2, 2022

(87) PCT Pub. No.: WO2021/075227
PCT Pub. Date: Apr. 22, 2021

(65) Prior Publication Data
US 2022/0290645 A1    Sep. 15, 2022

(30) Foreign Application Priority Data

Oct. 15, 2019   (JP) .................. 2019-188522

(51) Int. Cl.
*F02N 11/00*   (2006.01)
*B60W 10/06*   (2006.01)
(Continued)

(52) U.S. Cl.
CPC ......... *F02N 11/0859* (2013.01); *B60W 10/06* (2013.01); *B60W 10/08* (2013.01);
(Continued)

(58) Field of Classification Search
CPC ... B60W 2710/081; B60W 10/26; B60K 6/26; B60K 6/46; B60K 6/48; B60K 6/442;
(Continued)

(56) References Cited

U.S. PATENT DOCUMENTS

| 5,752,488 A | 5/1998 | Hattori et al. |
| 11,242,834 B1 * | 2/2022 | Leroy .................... B60K 17/02 |

(Continued)

FOREIGN PATENT DOCUMENTS

| JP | 9-170543 A | 6/1997 |
| JP | 2011-47348 A | 3/2011 |
| JP | 2012-106514 A | 6/2012 |

OTHER PUBLICATIONS

International Search Report, issued in PCT/JP2020/036267, PCT/ISA/210, dated Dec. 1, 2020.
(Continued)

*Primary Examiner* — Sizo B Vilakazi
*Assistant Examiner* — Sherman D Manley
(74) *Attorney, Agent, or Firm* — Birch, Stewart, Kolasch & Birch, LLP (57) ABSTRACT

A start control device for a hybrid vehicle includes a battery, first and second rotary electric machines, an engine, a first determination unit configured to determine whether the battery is in a low output state, a cranking control unit configured to perform a cracking of the engine, and a second determination unit configured to perform a cranking completion determination. In a case where a maximum output of the battery is in the low output state, the cranking control unit causes the first rotary electric machine to run at a low output target rotation speed, and the second determination unit determines that the cranking is completed when a condition
(Continued)

that an actual rotation speed of the first rotary electric machine continues to be within a target range for a predetermined time is satisfied.

4 Claims, 4 Drawing Sheets (51) Int. Cl.
*B60W 10/08* (2006.01)
*B60W 20/40* (2016.01)
*F02D 41/38* (2006.01)
*F02N 11/08* (2006.01)

(52) U.S. Cl.
CPC ............ *B60W 20/40* (2013.01); *F02D 41/38* (2013.01); *F02N 11/0848* (2013.01); *F02N 11/0862* (2013.01); *B60W 2510/0638* (2013.01); *B60W 2510/081* (2013.01); *F02N 2200/022* (2013.01); *F02N 2200/041* (2013.01)

(58) Field of Classification Search
CPC .......... B60L 15/20; B60L 50/16; B60L 50/61; B60L 58/12; F02N 5/04; F02N 2200/061; F02N 2300/102; F02N 2300/2002; F02D 41/062; F02D 29/02; F02D 29/06; Y02T 10/62; Y02T 10/70; Y02T 10/7072; Y02T 10/72

USPC ...................................... 701/113; 123/406.53
See application file for complete search history.

(56) References Cited

U.S. PATENT DOCUMENTS

| 11,292,474 B2* | 4/2022 | Nambu | B60W 30/20 |
| 11,767,039 B2* | 9/2023 | Fukai | B60W 40/13 701/23 |
| 2015/0012159 A1* | 1/2015 | Honda | B60W 20/10 180/65.265 |
| 2015/0226171 A1* | 8/2015 | Kees | B60W 10/26 290/31 |
| 2017/0314495 A1* | 11/2017 | Kanaya | F01L 1/3442 |
| 2017/0335816 A1* | 11/2017 | Hao | B60K 6/48 |
| 2019/0381994 A1* | 12/2019 | Nambu | B60W 10/10 |
| 2021/0348586 A1* | 11/2021 | Kucukarslan | F02N 11/087 |

OTHER PUBLICATIONS

Written Opinion of the International Searching Authority, issued in PCT/JP2020/036267, PCT/ISA/237, dated Dec. 1, 2020.

* cited by examiner

ENGINE START CONTROL DEVICE

TECHNICAL FIELD

The present disclosure relates to an engine start control device for a hybrid vehicle.

BACKGROUND ART

As related art, a hybrid vehicle including an engine and a rotary electric machine (a motor, a generator, or a motor generator) is provided with various traveling modes such as a mode in which the vehicle travels while the engine is stopped and a mode in which the vehicle travels by power of the rotary electric machine while the engine works. In the hybrid vehicle, for example, when the engine is started at the time of switching the traveling mode, the engine is cranked by the rotary electric machine and then subjected to initial combustion (see, for example, JP-A-2012-106514). According to a start control device disclosed in JP-A-2012-106514, when an engine is started, a target rotation speed of a motor generator is set to a predetermined low rotation speed and then set to a high rotation speed, so that a sufficient torque can be output for engine friction.

However, it is known that a battery, which is an electric power source of a rotary electric machine, has low battery output (maximum output) that can be taken out at a low temperature. In a state where the battery output is low, electric power that can be used by the rotary electric machine is reduced, and thus it may be difficult to crank the engine by the rotary electric machine. In this regard, it is conceivable to improve the battery so as to secure the battery output even at a low temperature, which is not preferable in consideration of development costs, manufacturing costs, and the like.

SUMMARY OF INVENTION

An engine start control device according to the present disclosure relates to reliably starting an engine even in a state where battery output is low in a hybrid vehicle.

According to a first aspect of the present disclosure, an engine start control device for a hybrid vehicle includes: a battery for a driving; a first rotary electric machine and a second rotary electric machine configured to work by consuming an electric power of the battery; an engine configured to start up with the first rotary electric machine; a first determination unit configured to determine whether a maximum output of the battery is in a low output state that is lower than a predetermined lower limit value; a cranking control unit configured to perform a cranking of the engine by running the first rotary electric machine when the hybrid vehicle transitions from an EV mode in which the hybrid vehicle is powered by at least one of the first rotary electric machine and the second rotary electric machine to travel only with the electric power of the battery, to a start mode in which the engine is started; a second determination unit configured to determine whether the cranking is completed; and an injection control unit configured to start a fuel injection of the engine in response to the second determination unit determining that the cranking is completed.

In a case where the first determination unit determines that the maximum output of the battery is in the low output state, the cranking control unit causes the first rotary electric machine to run at a target rotation speed lower than a target rotation speed of the cranking in a normal state different from the low output state. And, in a case where the first determination unit determines that the maximum output of the battery is in the low output state, the second determination unit determines that the cranking is completed when a condition that an actual rotation speed of the first rotary electric machine during the cranking continues to be within a preset target range for a predetermined time is satisfied.

According to a second aspect of the present disclosure, preferably, a maximum value of the target range may be set to a value lower than the target rotation speed of the cranking in the normal state.

According to a third aspect of the present disclosure, preferably, the engine start control device may further include: a torque control unit that controls a torque of the first rotary electric machine by a feedback control using a difference between the target rotation speed and the actual rotation speed of the first rotary electric machine during the cranking. In this configuration, in a case where the first determination unit determines that the maximum output of the battery is in the low output state, the torque control unit may set a feedback term used for calculating a target value of the torque to zero or more.

According to a fourth aspect of the present disclosure, preferably, in a case where the first determination unit determines that the maximum output of the battery is in the low output state and the second determination unit determines that the condition is satisfied, the torque control unit may set a feedforward term used for calculating the target value to zero.

According to a fifth aspect of the present disclosure, preferably, the engine start control device may further include: a third determination unit configured to determine that a start of the engine is completed in response to the actual rotation speed of the first rotary electric machine or an actual rotation speed of the engine exceeding a completion threshold value that is preset to a value higher than the target range, in a case where the first determination unit determines that the maximum output of the battery is in the low output state and the second determination unit determines that the cranking is completed.

According to the engine start control device according to the present disclosure, battery electric power consumed by the first rotary electric machine can be reduced in a state where the battery output is low in the hybrid vehicle, and thus the engine can be reliably started even in the state where the battery output is low.

DESCRIPTION OF EMBODIMENTS

An engine start control device (hereinafter referred to as a "start control device") according to an embodiment will be described with reference to the drawings. The embodiment described below is merely an example, and is not intended to exclude various modifications and technique applications that are not explicitly described in the following embodiment. Each configuration of the present embodiment can be variously modified and implemented without departing from the gist thereof. In addition, each configuration can be selected as necessary, or can be combined as appropriate.

[1. Overall Configuration]

Figure 1:
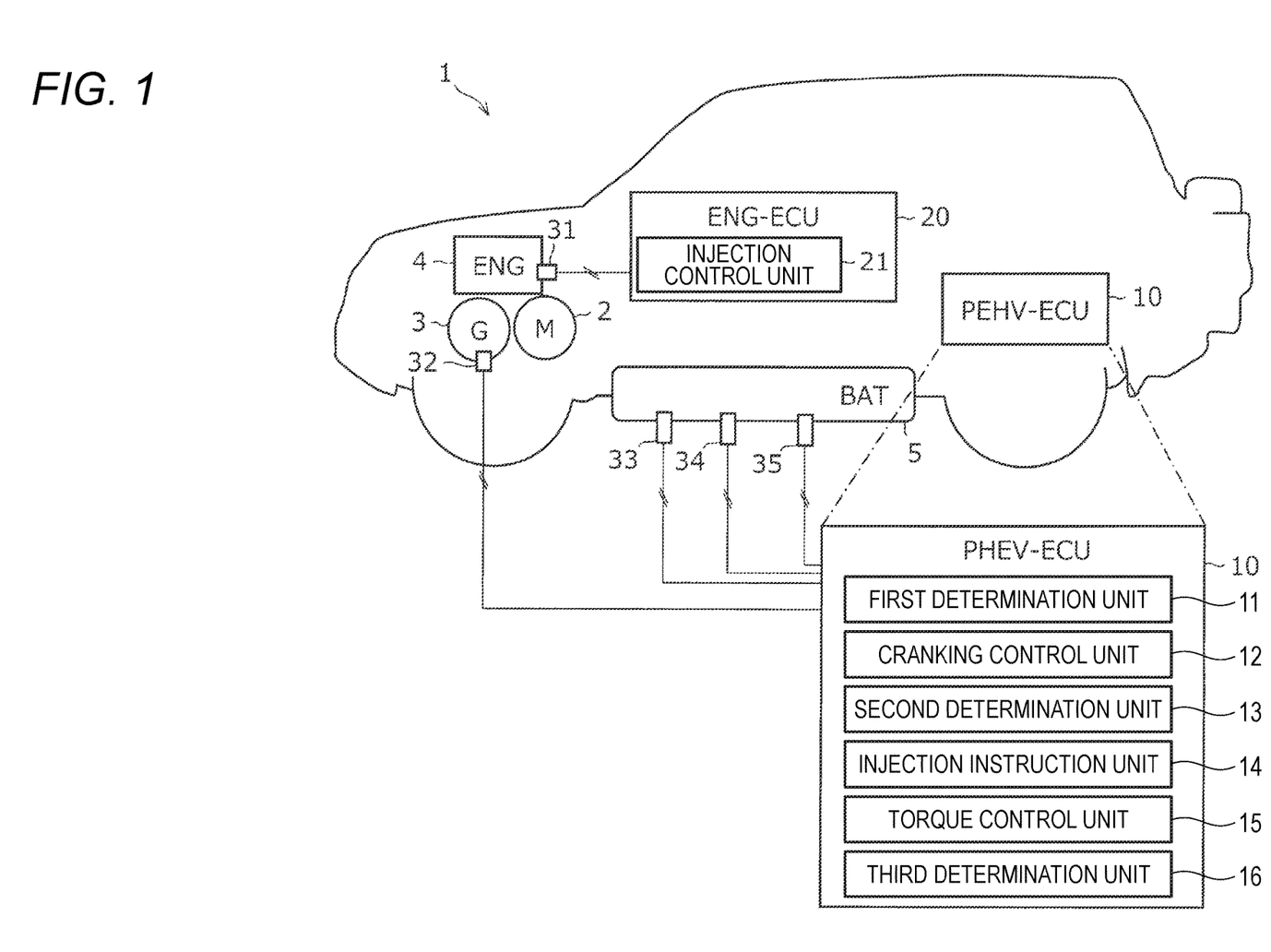
FIG. 1 is a schematic view showing a hybrid vehicle including an engine start control device according to an embodiment.

The start control device of the present embodiment is applied to a vehicle 1 shown in FIG. 1. The vehicle 1 is a hybrid vehicle that includes a drive battery 5, at least two rotary electric machines 2 and 3 that works by consuming electric power of the battery 5, and an engine 4 that is started by one rotary electric machine 3. In the present embodiment, the rotary electric machine 2 is a motor 2 for a driving (second rotary electric machine), and the rotary electric machine 3 is a generator 3 (first rotary electric machine) that generates electric power by power of the engine 4. Although the power of the engine 4 is transmitted to drive wheels separately from power of the motor 2 in the present embodiment, a configuration in which the power of the engine 4 is transmitted only to the generator 3 may also be adopted. In addition, another rotary electric machine may be mounted on the vehicle 1.

In the vehicle 1 of the present embodiment, three types of traveling modes such as an EV mode, a series mode, and a parallel mode, are prepared. A PHEV-ECU 10, which will be described later, selects one of these traveling modes in accordance with a vehicle state, a traveling state, a driving force required by a driver, and the like. The motor 2, the generator 3, and the engine 4 are selectively used in accordance with a type of the selected traveling mode.

The EV mode is a traveling mode in which the vehicle 1 is driven (travels) only by electric power of the battery 5 using the motor 2 as a power source while the generator 3 and the engine 4 are stopped. Even when the generator 3 is running (used as a power source) or when a third rotary electric machine is provided and the vehicle travels using the rotary electric machine as a power source, the EV mode is included as long as the vehicle travels using only the electric power of the battery 5.

The series mode is a traveling mode in which the generator 3 is driven by the engine 4 to generate electric power, and the vehicle 1 is driven by the motor 2 using such electric power (generated electric power) or using the generated electric power and the battery electric power. The parallel mode is a traveling mode in which the vehicle 1 is mainly driven by a driving force of the engine 4, and the driving of the vehicle 1 is assisted by the motor 2 as necessary. The vehicle 1 of the present embodiment is provided with an "engine start mode" in which the stopped engine 4 is started when switching from the EV mode to the series mode or the parallel mode is performed. That is, after transition from the EV mode to the engine start mode, transition to the series mode or the parallel mode is made. Hereinafter, the traveling modes (EV mode, series mode, parallel mode) plus the engine start mode are referred to as "traveling operation modes".

The motor 2 is provided as a drive source of the vehicle 1. An electric power source of the motor 2 is electric power stored in the battery 5 or electric power generated by the generator 3. Although FIG. 1 shows an example in which only one motor 2 is disposed on a front side, the number of motor 2 (rotary electric machine) mounted on the vehicle 1 is not limited to one, and motors may be provided both on the front side and a rear side, or may be provided for each wheel, for example.

The generator 3 can supply electric power generated by the power of the engine 4 to at least the motor 2. Each of the motor 2 and the generator 3 of the present embodiment is a motor generator having both a function as a motor and a function as a generator. The motor 2 mainly functions as a motor to drive the vehicle 1, and functions as a generator during regeneration. The generator 3 functions as a motor (starter) when the engine 4 is started, and generates electric power by engine power when the engine 4 works. In the present embodiment, the generator 3 and the engine 4 are directly connected to each other via a gear pair (not shown). A rotation speed of the generator 3 and a rotation speed of the engine 4 are deviated from each other by a gear ratio.

A control unit (for example, MCU or GCU, not shown) including an inverter that converts a direct current and an alternating current is provided around (or inside) each of the motor 2 and the generator 3. The rotation speed of each of the motor 2 and the generator 3 is controlled by controlling the inverter. Working states of the motor 2, the generator 3, and each inverter are controlled by the PHEV-ECU 10.

The engine 4 is an internal combustion engine (gasoline engine, diesel engine) that burns gasoline or light oil. A working state of the engine 4 is controlled by an ENG-ECU 20, which will be described later. A speed reduction mechanism, a power distribution mechanism, and the like may be provided on a power transmission path connecting the motor 2, the generator 3, and the engine 4 to the drive wheels.

The battery 5 is a high voltage power supply configured to be capable of charging and discharging regenerated power by the motor 2 and generated power by the generator 3. The battery 5 of the present embodiment is configured by connecting a plurality of battery cells (for example, lithium ion secondary battery or nickel hydrogen secondary battery). The battery 5 may be configured to be capable of being externally charged by a power supply outside the vehicle, that is, charged by a household AC power supply (normal charging) or charged by a high voltage DC power supply (quick charging).

The vehicle 1 is provided with an engine rotation speed sensor 31 that detects the rotation speed of the engine 4, a generator rotation speed sensor 32 that detects the rotation speed of the generator 3, a temperature sensor 33 that detects a cell temperature of the battery 5, a voltage sensor 34 that detects a cell voltage of the battery 5, and a current sensor 35 that detects a current of the battery 5. Information detected by the engine speed sensor 31 is transmitted to the ENG-ECU 20, and information detected by the sensors 32 to 35 is transmitted to the PHEV-ECU 10.

The PHEV-ECU 10 is an electronic control unit (computer) that integrally controls various devices mounted on the vehicle 1. The ENG-ECU 20 is an electronic control unit (computer) that comprehensively controls the engine 4. A processor, a memory, an interface device, and the like (all of which are not shown) that are connected to each other via a bus are built in each of the control devices 10 and 20, and are connected to a communication line of an in-vehicle network provided in the vehicle 1. The control devices 10 and 20 can communicate with each other.

The processor is a processing device including, for example, a control unit (control circuit), an arithmetic unit (arithmetic circuit), a cache memory (register), and the like. The memory is a storage device in which programs and data during work are stored, and includes a ROM, a RAM, a nonvolatile memory, and the like. Contents of control executed by each of the control devices 10 and 20 are recorded and stored in the memory as firmware or an application program. When a program is executed, contents of the program are loaded in memory space and executed by the processor.

The start control device of the present embodiment performs start control in order to reliably start the engine 4 even in a low output state where maximum output SOP of the battery 5 is lower than a predetermined lower limit value PL, and includes the two control devices 10 and 20 described above. The maximum output SOP is a maximum value of battery output that can be taken out from the battery 5 at a certain moment (that can be charged and discharged), which is a value increases as a state of charge of the battery 5 becomes higher. The lower limit value PL is battery output required by the generator 3 when the generator 3 cranks the engine 4 by a conventional method, and is set in advance according to types and performance of the generator 3 and the battery 5. That is, the low output state is a state where it is difficult to perform cranking by the generator 3 according to the conventional method.

[2. Control Configuration]

As elements for performing the start control, the PHEV-ECU 10 is provided with a first determination unit 11, a cranking control unit 12, a second determination unit 13, an injection instruction unit 14, a torque control unit 15, and a third determination unit 16, and the ENG-ECU 20 is provided with an injection control unit 21. These elements show a part of functions of programs executed by the control devices 10 and 20, and are implemented by software. However, a part or all of the functions may be implemented by hardware (electronic circuit), or may be implemented by a combination of software and hardware.

The first determination unit 11 determines whether the battery 5 is in the low output state where the maximum output SOP of the battery 5 is lower than the lower limit value PL. The maximum output SOP is calculated based on the state of charge of the battery 5, a deterioration degree of the battery 5, and a battery temperature in addition to the state of charge. The maximum output SOP may be calculated by the first determination unit 11 or may be calculated by a calculation unit (not shown). The determination performed by the first determination unit 11 is performed during the EV mode and during the engine start mode when the EV mode is switched to the series mode or the parallel mode.

The cranking control unit 12 cranks the engine 4 by running the generator 3 when the vehicle 1 transitions from the EV mode in which the vehicle 1 travels only with electric power of the battery 5 to the engine start mode. In a normal state that is not the low output state, the cranking control unit 12 causes the generator 3 to run at a normal target rotation speed NgN and cranks the engine 4. Hereinafter, the target rotation speed NgN of cranking in the normal state is referred to as a "normal target rotation speed NgN".

On the other hand, when the first determination unit 11 determines that the battery 5 is in the low output state, the cranking control unit 12 causes the generator 3 to run at a target rotation speed NgL lower than the normal target rotation speed NgN, and cranks the engine 4. Hereinafter, the target rotation speed NgL of cranking in the low output state is referred to as a "low output target rotation speed NgL". The low output target rotation speed NgL is set to, for example, about 10 to 50% of the normal target rotation speed NgN.

When the first determination unit 11 determines that the battery 5 is in the low output state while cranking is performed at the normal target rotation speed NgN (that is, when the maximum output SOP becomes lower than the lower limit value PL during the cranking), the cranking control unit 12 of the present embodiment switches the target rotation speed to the low output target rotation speed NgL and continues the cranking. The cranking performed by the cranking control unit 12 is ended after completion is determined by the second determination unit 13 (for example, when the determination is performed or when fuel injection is started).

The second determination unit 13 determines whether the cranking of the engine 4 is completed. For example, the second determination unit 13 determines that the cranking is completed when the rotation speed detected by the generator rotation speed sensor 32 (hereinafter, also referred to as an "actual generator rotation speed Ng") continues to be in the vicinity of the normal target rotation speed NgN for a predetermined time in the normal state. Alternatively, the second determination unit 13 may determine that the cranking is completed when the rotation speed detected by the engine rotation speed sensor 31 (hereinafter, also referred to as an "actual engine rotation speed Ne") continues to be in the vicinity of a predetermined rotation speed, which is obtained from the normal target rotation speed NgN and the gear ratio, for a predetermined time in the normal state. Hereinafter, a condition for determining whether the cranking in the normal state is completed is referred to as a "normal cranking completion condition".

On the other hand, when the first determination unit 11 determines that the battery 5 is in the low output state, the second determination unit 13 determines that the cranking is completed when a condition that the actual generator rotation speed Ng during the cranking continues to be within a preset target range Rtgt for a predetermined time is satisfied. Hereinafter, this condition is referred to as a "low output cranking completion condition". The target range Rtgt is set to a range in which a value obtained by adding a predetermined value A to the low output target rotation speed NgL is set as a maximum value and a value obtained by subtracting the same predetermined value A from the low output target rotation speed NgL is set as a minimum value.

That is, the second determination unit 13 determines that the cranking is completed when a state where the actual rotation speed Ng of the generator 3 is in the vicinity of the low output target rotation speed NgL continues for a predetermined time. In the present embodiment, the maximum value of the target range Rtgt is set to a value lower than the normal target rotation speed NgN (for example, a value equal to or less than half of the normal target rotation speed NgN). In other words, in the low output state, it is determined that the cranking is completed when the actual rotation speed Ng of the generator 3 has, for example, a value equal to or less than half of that in the normal state. The "predetermined time" of the determination condition may be the same in the normal state and the low output state, or may be shorter in the low output state as compared with the normal state. The predetermined time may be set in advance to at least a time at which it can be determined that rotation of the generator 3 is stable (a constant rotation state is achieved).

When the second determination unit 13 determines that the cranking is completed, the injection instruction unit 14 outputs a command (signal) to the ENG-ECU 20 to start fuel injection of the engine 4. The injection control unit 21 of the ENG-ECU 20 starts the fuel injection when the command from the injection instruction unit 14 is input. That is, in the low output state, as compared with the normal state, the fuel injection is started from a time when the generator 3 rotates at a low speed, and an engine rotation speed is increased by the engine 4 itself.

During the cranking of the engine 4, the torque control unit 15 controls a torque of the generator 3 by feedback control using a difference ΔNg (=target rotation speed−actual rotation speed, hereinafter referred to as a "rotation speed difference ΔNg") between the target rotation speed (NgN or NgL) and the actual rotation speed Ng of the generator 3. In the present embodiment, a case where feedback control using a P gain and an I gain is performed will be described as an example.

The torque control unit 15 of the present embodiment calculates a feedback term (hereinafter referred to as an "FB term") based on a target rotation speed of the engine 4 (hereinafter referred to as a "target engine rotation speed Netgt") and the actual engine rotation speed Ne, and calculates a target torque of the generator 3 by adding a feedforward term (hereinafter referred to as an "FF term") corresponding to a friction torque of the engine 4 to the FB term (=FF term+FB term). The FB term is an adjustment term indicating a torque for causing the actual rotation speed Ng of the generator 3 to reach the target rotation speed. The FF term is a friction torque value measured in advance, and varies depending on an engine rotation speed and an engine water temperature. The FF term may be calculated by the PHEV-ECU 10 or may be received from the ENG-ECU 20.

The torque control unit 15 sets the P gain and the I gain in the normal state to be different from those in the low output state. The target engine rotation speed Netgt is calculated from the normal target rotation speed NgN and the gear ratio. Then, the FB term is calculated from the set P gain and I gain and the rotation speed difference ΔNg, the target torque is calculated by adding the FB term to the FF term, and the generator 3 is controlled in such a manner that an actual torque of the generator 3 becomes the target torque (target value).

On the other hand, when the first determination unit 11 determines that the battery 5 is in the low output state, the torque control unit 15 sets the FB term to 0 or more. When the FB term is set to 0, the FF term is set to the target torque, and when the FB term is set to a value larger than 0, FF term+FB term (>0) is set to the target torque. This is because, in the low output state, the target rotation speed NgL of the generator 3 is lower than the normal target rotation speed NgN, and even though the engine rotation speed is about to be increased by the engine 4 itself, if the FB term is a negative value, the generator 3 is about to maintain the target rotation speed NgL, and thus the rotation speed is not increased. That is, by setting the FB term to 0 or more, torque absorption of the generator 3 is neutralized such that the increase in the rotation speed is not inhibited.

Timing when the FB term is set to 0 or more may be a time point when the transition from the EV mode to the engine start mode is made, or may be a time point when "the actual generator rotation speed Ng≥the low output target rotation speed NgL" is satisfied. In the latter case, when the actual generator rotation speed Ng is lower than the low output target rotation speed NgL, the FB term may have a negative value. In this way, the target torque is calculated using the FB term only when the rotation speed is increased, so that target rotation can be achieved at an early stage.

The torque control unit 15 of the present embodiment sets the FF term to 0 when the first determination unit 11 determines that the battery 5 is in the low output state and the second determination unit 13 determines that the low output cranking completion condition is satisfied. As a result, since a running torque of the generator 3 is limited, the battery power is not taken out after the actual rotation speed Ng of the generator 3 is increased to the target range Rtgt, and thus a load on the battery 5 is reduced. Timing when the FF term is set to 0 is not limited to a time point when the first determination unit 11 and the second determination unit 13 make the above determination, and the FF term may also gradually approach 0 as the actual rotation speed Ng of the generator 3 increases.

The third determination unit 16 determines completion of the start of the engine 4 (completion of the engine start mode). The third determination unit 16 determines that the start of the engine 4 is completed when the actual engine rotation speed Ne is in the vicinity of the target rotation and the torque of the generator 3 falls below a predetermined torque threshold value in the normal state. Hereinafter, this condition is referred to as a "normal start completion condition". The former condition of the normal start completion condition (that is, the state where "the actual engine rotation speed Ne is in the vicinity of the target rotation") is also included in the normal cranking completion condition. In this state, when the torque of the generator 3 falls below the predetermined torque threshold value, it means that torque absorption by the generator 3 has occurred. In other words, the torque threshold value is set in advance to a value at which occurrence of torque absorption can be determined.

On the other hand, when the first determination unit 11 determines that the battery 5 is in the low output state and the second determination unit 13 determines that the cranking is completed, the third determination unit 16 determines that the start of the engine 4 is completed when the actual rotation speed Ng of the generator 3 exceeds a preset completion threshold value Ngc. Alternatively, when the actual engine rotation speed Ne exceeds a predetermined completion threshold value (a value obtained by adding the gear ratio to the above completion threshold value Ngc), it may be determined that the start of the engine 4 is completed. Hereinafter, this condition is referred to as a "low output start completion condition". The completion threshold value Ngc is a value higher than the target range Rtgt, and is set to, for example, a value equivalent to the normal target rotation speed NgN.

When the third determination unit 16 determines that the start of the engine 4 is completed, the start control is ended, the traveling operation mode is switched to the series mode or the parallel mode, and various types of control (engine control and motor control) suitable for the series mode or the parallel mode are performed.

[3. Flowchart]

Figure 2:
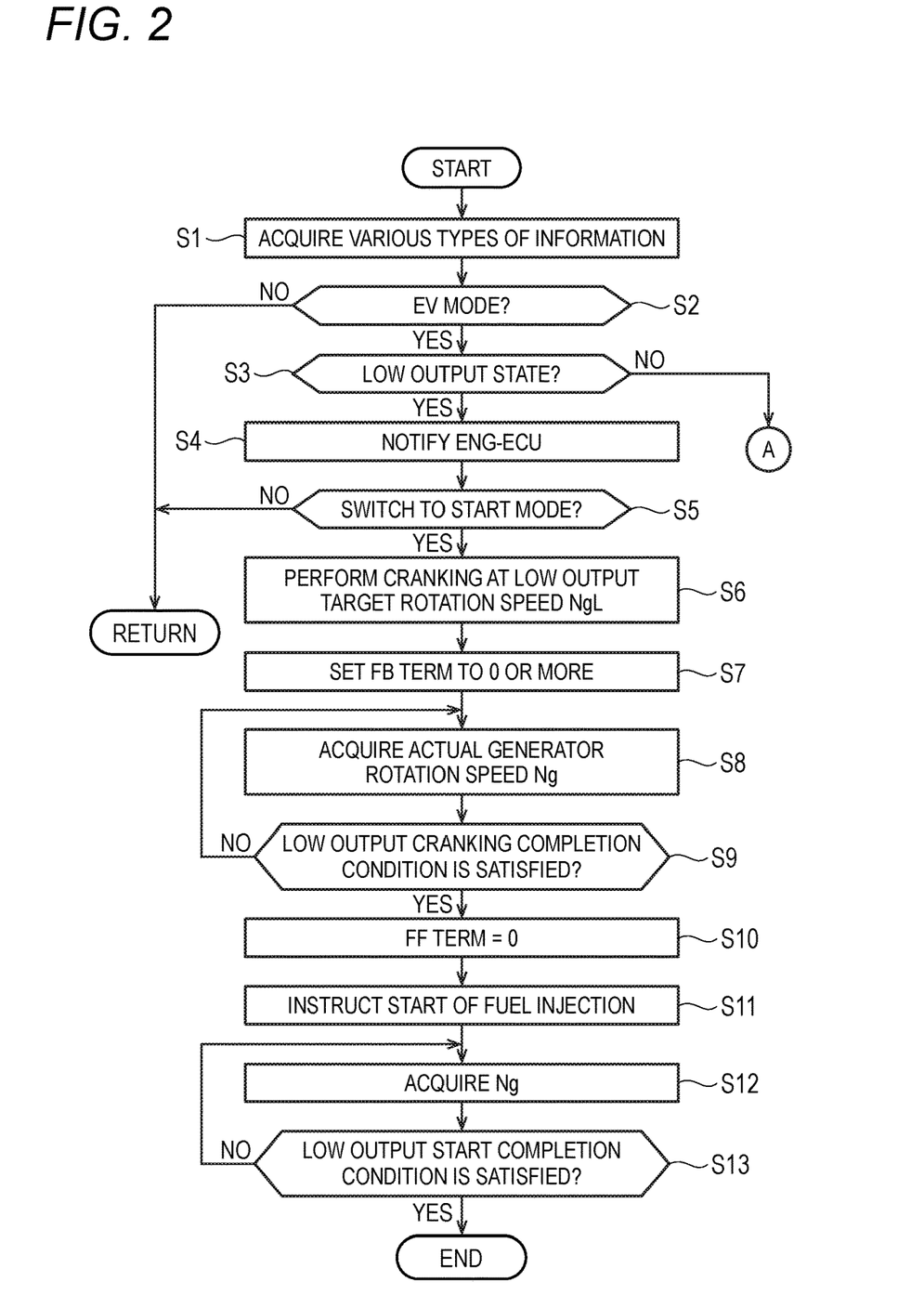
FIG. 2 is a flowchart showing start control performed by the engine start control device.
Figure 3:
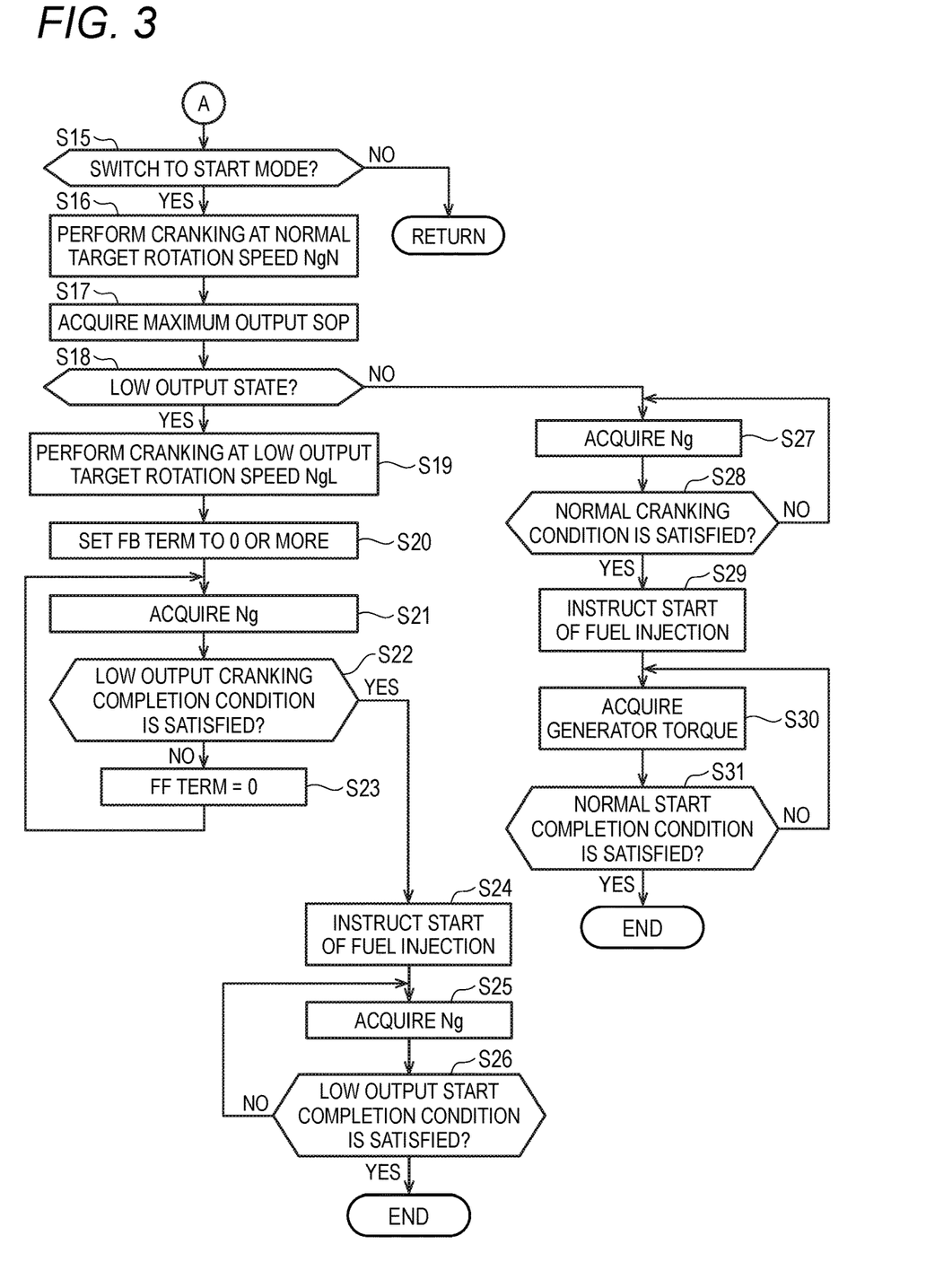
FIG. 3 is a flowchart showing the start control.

FIGS. 2 and 3 are an example of a flowchart for explaining the start control described above. This flowchart is repeatedly executed in the PHEV-ECU 10 at a predetermined calculation cycle, for example, when a power switch of the vehicle 1 is ON. It should be noted that the calculation of the maximum output SOP, the setting (switching) of the traveling operation mode, and the control performed by the ENG-ECU 20 are performed separately from this flowchart.

In step S1, various types of information, such as the information detected by the sensors 31 to 35, the calculated maximum output SOP, and the set traveling operation mode, are acquired. In step S2, it is determined whether the current traveling operation mode is the EV mode. If the current traveling operation mode is not the EV mode, this flow is returned. In the case of the EV mode, in the following step S3, it is determined whether the battery 5 is in the low output state. In the case of the low output state, the process proceeds to step S4, and the ENG-ECU 20 is notified that the battery 5 is in the low output state. On the other hand, if the battery 5 is not in the low output state, the process proceeds to step S15 shown in FIG. 3.

In step S5 shown in FIG. 2, it is determined whether the traveling operation mode is switched to the engine start mode. If the traveling operation mode is not switched to the engine start mode, this flow is returned. When the traveling operation mode is switched from the EV mode to the engine start mode, the process proceeds to step S6, cranking is performed at the low output target rotation speed NgL, and the FB term for calculating the target torque is set to 0 or more (step S7). Then, the actual generator rotation speed Ng is acquired by the generator rotation speed sensor 32 (step S8), and it is determined whether the above-described low output cranking completion condition is satisfied based on the actual generator rotation speed Ng (step S9).

The processes of steps S8 and S9 are repeated until it is determined in step S9 that the low output cranking completion condition is satisfied. When the low output cranking completion condition is satisfied, the process proceeds from step S9 to step S10, the FF term for calculating the target torque is set to 0, and a command is output to the ENG-ECU 20 to start fuel injection (step S11). As a result, the ENG-ECU 20 starts the fuel injection by the injection control unit 21.

In step S12, the actual generator rotation speed Ng is acquired by the generator rotation speed sensor 32, and it is determined whether the low output start completion condition is satisfied based on the actual rotation speed Ng (step S13). The processes of steps S12 and S13 are repeated until it is determined in step S13 that the low output start completion condition is satisfied. Then, when the low output start completion condition is satisfied, this flow (start control) is ended.

When it is determined in step S3 that the battery 5 is not in the low output state, the process proceeds to step S15 shown in FIG. 3, and it is determined whether the traveling operation mode is switched to the engine start mode. If the traveling operation mode is not switched to the engine start mode, this flow is returned. When the traveling operation mode is switched from the EV mode to the engine start mode, the process proceeds to step S16, and cranking is performed at the normal target rotation speed NgN. Next, in step S17, the maximum output SOP is acquired, and in step S18, it is determined again whether the battery 5 is in the low output state.

When it is determined that the battery 5 is in the low output state during the cranking at the normal target rotation speed NgN, the process proceeds to step S19. When it is determined that the battery 5 is not in the low output state (remains in the normal state), the process proceeds to step S27. In step S19, the target rotation speed of the cranking is switched to the low output target rotation speed NgL and the cranking is continued. In step S20, the FB term for calculating the target torque is set to 0 or more. Then, the actual generator rotation speed Ng is acquired by the generator rotation speed sensor 32 (step S21), and it is determined whether the above-described low output cranking completion condition is satisfied based on the actual rotation speed Ng (step S22).

When it is determined in step S22 that the low output cranking completion condition is not satisfied, the FF term for calculating the target torque is set to 0 in step S23, and the process returns to step S21. Then, the processes of steps S21 to S23 are repeated until the determination condition of step S22 is satisfied. When the low output start completion condition is satisfied, the process proceeds from step S22 to step S24, and a command is output to the ENG-ECU 20 to start fuel injection (step S24). As a result, the ENG-ECU 20 starts the fuel injection by the injection control unit 21.

In step S25, the actual generator rotation speed Ng is acquired by the generator rotation speed sensor 32, and it is determined whether the low output start completion condition is satisfied based on the actual rotation speed Ng (step S26). The processes of steps S25 and S26 are repeated until it is determined in step S26 that the low output start completion condition is satisfied. Then, when the low output start completion condition is satisfied, this flow (start control) is ended.

On the other hand, when the process proceeds from step S18 to step S27, the actual generator rotation speed Ng is acquired by the generator rotation speed sensor 32, and it is determined whether the normal cranking completion condition is satisfied based on the actual rotation speed Ng (step S28). The processes of steps S27 and S28 are repeated until it is determined in step S28 that the normal cranking completion condition is satisfied.

When the normal cranking completion condition is satisfied, the process proceeds from step S28 to step S29, and a command is output to the ENG-ECU 20 to start fuel injection. As a result, the ENG-ECU 20 starts the fuel injection by the injection control unit 21. Thereafter, the torque of the generator 3 is acquired (step S30), and it is determined whether the normal start completion condition is satisfied (step S31). The processes of steps S30 and S31 are repeated until this condition is satisfied, and when the condition is satisfied, this flow (start control) is ended.

[4. Functions and Effects]

Figure 4:
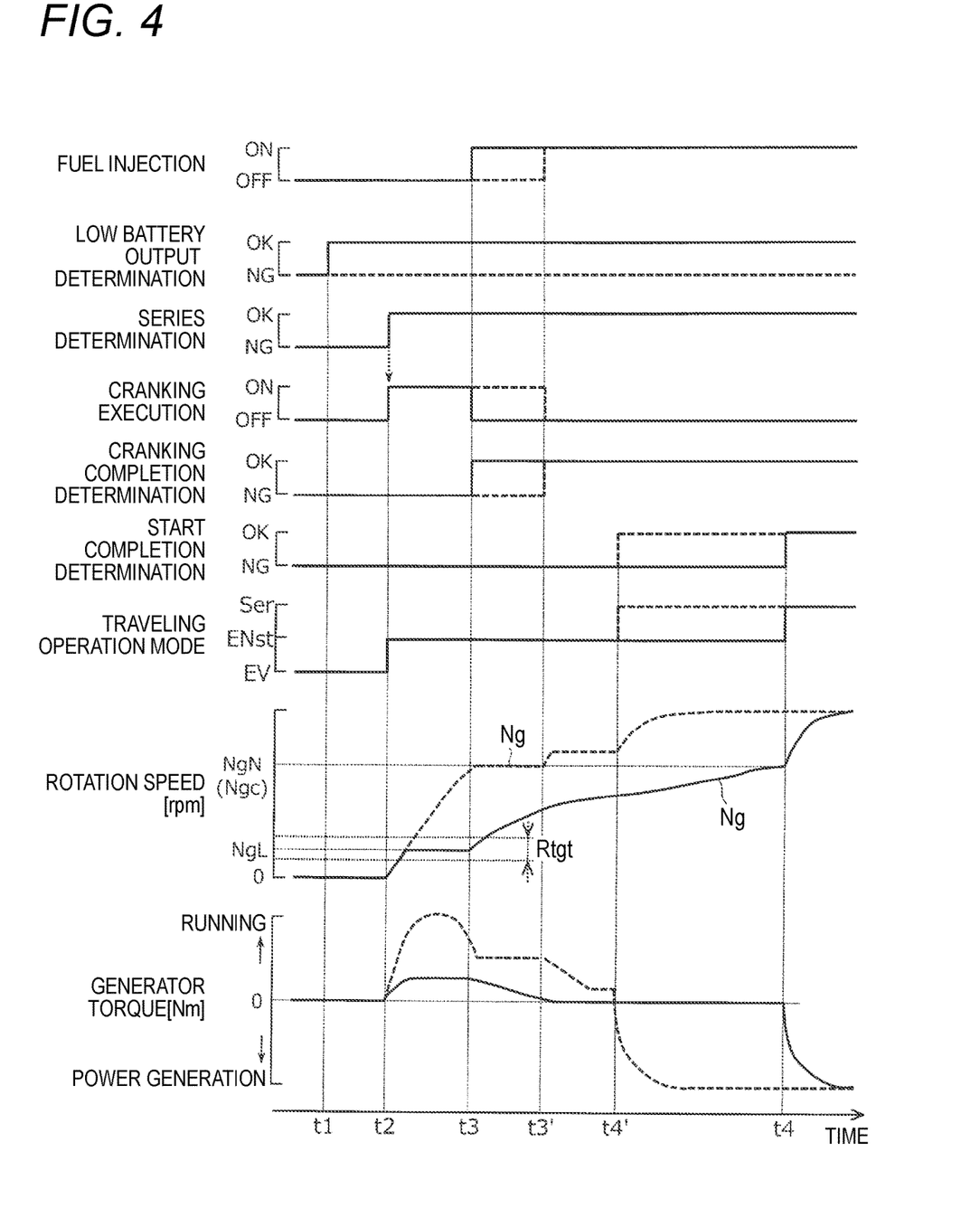
FIG. 4 is a timing chart showing the start control.

FIG. 4 is a timing chart showing the start control described above. In the drawing, a solid line indicates control contents, changes in rotation speed, and changes in torque in the low output state, while a broken line indicates control contents, changes in rotation speed, and changes in torque in the normal state.

At a time t1 in FIG. 4, it is determined that the battery 5 is in the low output state when the traveling operation mode is the EV mode. In this state, as shown at a time t2, when it is determined that it is necessary to switch to the series mode or the parallel mode (here, a case where series determination is changed from NG to OK is exemplified), a cranking execution flag is switched from OFF to ON, and cranking by the generator 3 is performed. The target rotation speed at this time is the low output target rotation speed NgL. As a result, the actual rotation speed Ng of the generator 3 increases to the vicinity of the low output target rotation speed NgL as indicated by the solid line in the drawing.

When the generator 3 runs at the low output target rotation speed NgL and the actual rotation speed Ng continues to be within the target range Rtgt for a predetermined time (time t3), the low output cranking completion condition is satisfied. At the time t3, a cranking completion determination flag is switched from OFF to ON, the cranking execution flag is switched from ON to OFF, and the fuel injection of the engine 4 is started (fuel injection flag is switched from OFF to ON). That is, after the time t3, the rotation speed Ng (actual engine rotation speed Ne) is increased by the engine 4 itself.

In this way, according to the start control device described above, in the low output state, the target rotation speed during the cranking is lower than the normal target rotation speed NgN. Therefore, as indicated by the broken line in the drawing, battery power consumed by the generator 3 can be reduced as compared with a case where the rotation speed is increased by the generator 3. Therefore, even when the battery 5 is in the low output state, the engine 4 can be reliably started.

In the normal state, when the traveling operation mode is the EV mode, if it is determined that it is necessary to switch to the series mode or the parallel mode (time t2), cranking is performed by the generator 3. The target rotation speed at this time is the normal target rotation speed NgN. As a result, the actual rotation speed Ng of the generator 3 increases to the vicinity of the normal target rotation speed NgN as indicated by the broken line in the drawing. When it is determined that the normal cranking completion condition is satisfied (time t3'), the cranking completion determination flag is switched from OFF to ON, the cranking execution flag is switched from ON to OFF, and the fuel injection of the engine 4 is started (fuel injection flag is switched from OFF to ON), as indicated by the broken line in the drawing.

According to the start control device described above, since the maximum value of the target range Rtgt is set to a value lower than the normal target rotation speed NgN, the fuel injection is started at a lower rotation speed in the low output state than in the normal state. As a result, since the engine 4 itself can increase the rotation speed at an early stage, the engine 4 can be reliably started even in the low output state.

According to the start control device described above, when it is determined that the battery 5 is in the low output state, the FB term for calculating the target torque is set to 0 or more. That is, since the FB term is not less than 0 during the cranking in the low output state, torque absorption of the generator 3 can be neutralized. As a result, after the time t3 shown in FIG. 4, when the engine 4 itself increases the rotation speed, the cranking can be completed without inhibiting the increase.

Further, according to the start control device described above, after the time t3 shown in FIG. 4, the FF term for calculating the target torque is set to 0. That is, since the FF term becomes 0 after the actual generator rotation speed Ng is increased to the target range Rtgt during the cranking in the low output state, the running torque of the generator 3 can be limited. In other words, the engine can be prevented from being driven by the generator 3, and thus the battery power can be prevented from being taken out after the actual generator rotation speed Ng is increased to the target range Rtgt, and thus the load on the battery 5 can be further reduced.

In the case of the start control device described above, in the normal state, when the actual engine rotation speed Ne is in the vicinity of the target rotation and the torque of the generator 3 falls below the predetermined torque threshold value (at time t4'), it is determined that the start of the engine 4 is completed. That is, in the normal state, it is possible to determine the completion of the start based on occurrence of torque absorption by the generator 3. On the other hand, in the low output state, since the torque absorption is neutralized, the start completion determination cannot be performed based on the torque. In this regard, according to the start control device described above, when the actual rotation speed Ng exceeds the completion threshold value Ngc (at time t4), it is determined that the start of the engine 4 is completed. That is, even in the low output state, since the start completion determination can be performed using the actual generator rotation speed Ng, the EV mode can be quickly shifted to the series mode or the parallel mode.

[5. Others]

The configuration of the start control device described above is an example. Although the case where the start control device is constituted by the PHEV-ECU 10 and the ENG-ECU 20 has been exemplified in the above embodiment, the start control device may be constituted by one electronic control device, or may be constituted by three or more electronic control devices.

The above-described feedback control by the torque control unit 15 is an example, and the torque of the generator 3 may be controlled by a method other than the above-described method. For example, the feedback control may be performed using a D gain in addition to the P gain and the I gain, or the torque of the generator 3 may be controlled by feedforward control. The method of obtaining the FF term and the FB term and the set value are not limited to those described above.

The determination conditions of the first determination unit 11, the second determination unit 13, and the third determination unit 16 are merely examples, and are not limited to the above-described contents. For example, although the target range Rtgt included in the low output cranking completion condition is set to "the low output target rotation speed NgL±the predetermined value A" in the above embodiment, the target range Rtgt is not limited thereto, and may be a predetermined range including at least the low output target rotation speed NgL.

The rotary electric machines 2 and 3 mounted on the vehicle 1 are not limited to the motor 2 and the generator 3 described above. The first rotary electric machine may be a motor generator or a generator including a rotating armature or a field magnet and having at least a function of starting the engine 4. In addition, the second rotary electric machine may be a motor generator or a motor including a rotating armature or a field magnet and has at least an electric motor function.

The present application is based on Japanese Patent Application No. 2019-188522 filed on Oct. 15, 2019, and the contents thereof are incorporated herein as reference.

REFERENCE SIGNS LIST

1: vehicle (hybrid vehicle)
2: motor (second rotary electric machine)
3: generator (first rotary electric machine)
4: engine
5: battery
10: PHEV-ECU
11: first determination unit
12: cranking control unit
13: second determination unit
14: injection instruction unit
15: torque control unit
16: third determination unit
20: ENG-ECU
21: injection control unit
31: engine rotation speed sensor
32: generator rotation speed sensor
33: temperature sensor
34: voltage sensor
35: current sensor
Ne: actual engine rotation speed
Netgt: target engine rotation speed
Ng: actual generator rotation speed
Ngc: completion threshold value
NgL: low output target rotation speed
NgN: normal target rotation speed
PL: lower limit value
Rtgt: target range
SOP: maximum output
ΔNg: rotation speed difference

The invention claimed is:

1. An engine start control device for a hybrid vehicle, comprising:
   a battery for a driving;
   a first rotary electric machine and a second rotary electric machine configured to work by consuming an electric power of the battery;

an engine configured to start up with the first rotary electric machine;
a first determination unit configured to determine whether a maximum output of the battery is in a low output state that is lower than a predetermined lower limit value;
a cranking control unit configured to perform a cranking of the engine by running the first rotary electric machine when the hybrid vehicle transitions from an EV mode in which the hybrid vehicle is powered by at least one of the first rotary electric machine and the second rotary electric machine to travel only with the electric power of the battery, to a start mode in which the engine is started;
a second determination unit configured to determine whether the cranking is completed; and
an injection control unit configured to start a fuel injection of the engine in response to the second determination unit determining that the cranking is completed, wherein
in a case where the first determination unit determines that the maximum output of the battery is in the low output state, the cranking control unit causes the first rotary electric machine to run at a target rotation speed lower than a target rotation speed of the cranking in a normal state different from the low output state,
in a case where the first determination unit determines that the maximum output of the battery is in the low output state, the second determination unit determines that the cranking is completed when a condition that an actual rotation speed of the first rotary electric machine during the cranking continues to be within a preset target range for a predetermined time is satisfied,
the engine start control device further comprises: a torque control unit that controls a torque of the first rotary electric machine by a feedback control using a difference between the target rotation speed and the actual rotation speed of the first rotary electric machine during the cranking, and
in a case where the first determination unit determines that the maximum output of the battery is in the low output state, the torque control unit sets a feedback term used for calculating a target value of the torque to zero or more.

2. The engine start control device according to claim 1, wherein a maximum value of the target range is set to a value lower than the target rotation speed of the cranking in the normal state.

3. The engine start control device according to claim 1, wherein
in a case where the first determination unit determines that the maximum output of the battery is in the low output state and the second determination unit determines that the condition is satisfied, the torque control unit sets a feedforward term used for calculating the target value to zero.

4. The engine start control device according to claim 1, further comprising:
a third determination unit configured to determine that a start of the engine is completed in response to the actual rotation speed of the first rotary electric machine or an actual rotation speed of the engine exceeding a completion threshold value that is preset to a value higher than the target range, in a case where the first determination unit determines that the maximum output of the battery is in the low output state and the second determination unit determines that the cranking is completed.

\* \* \* \* \*